US006965975B2

(12) United States Patent
Jeong

(10) Patent No.: US 6,965,975 B2
(45) Date of Patent: Nov. 15, 2005

(54) APPARATUS AND METHOD FOR MOVING CONTENTS HAVING A RESTRICTED NUMBER OF COPIES BETWEEN STORAGE MEDIA

(75) Inventor: Jae Yoon Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 10/022,889

(22) Filed: Dec. 20, 2001

(65) Prior Publication Data

US 2002/0144067 A1 Oct. 3, 2002

(30) Foreign Application Priority Data

Mar. 31, 2001 (KR) .......................................... 2001-17207
Mar. 31, 2001 (KR) .......................................... 2001-17208

(51) Int. Cl.$^7$ ............................................. G06F 13/00
(52) U.S. Cl. ...................... 711/161; 711/162; 711/154; 380/201; 380/203; 386/94
(58) Field of Search ......................... 711/161–162, 154; 386/94; 380/201, 203; 707/204

(56) References Cited

U.S. PATENT DOCUMENTS

| | | | |
|---|---|---|---|
| 6,578,149 B1 * | 6/2003 | Kawamae et al. | 713/200 |
| 6,603,576 B1 * | 8/2003 | Nakamura et al. | 358/3.28 |
| 6,636,953 B2 * | 10/2003 | Yuasa et al. | 711/161 |
| 6,700,989 B1 * | 3/2004 | Itoh et al. | 382/100 |
| 2001/0012440 A1 * | 8/2001 | Itoi | 386/94 |
| 2001/0042043 A1 * | 11/2001 | Shear et al. | 705/51 |
| 2002/0156742 A1 * | 10/2002 | Ogino et al. | 705/57 |

FOREIGN PATENT DOCUMENTS

JP 2000-149417 A 5/2000

* cited by examiner

Primary Examiner—Gary Portka
Assistant Examiner—Jasmine Song
(74) Attorney, Agent, or Firm—Birch, Stewart, Kolasch & Birch, LLP

(57) ABSTRACT

An apparatus for moving contents includes an input unit for inputting the contents and a control unit for controlling the movement of the contents between storage media by analyzing a copy control code of the contents. The method for moving contents includes the steps of analyzing a copy control code of the contents when a user desires to move the contents from a first storage medium to a second storage medium and storing the contents in the second storage medium by converting the copy control code of the contents according to the result of analysis, thereby providing improved convenience to the user as long as copyrights are not infringed by storing the stored contents in the second storage medium.

6 Claims, 7 Drawing Sheets

APPARATUS AND METHOD FOR MOVING CONTENTS HAVING A RESTRICTED NUMBER OF COPIES BETWEEN STORAGE MEDIA

BACKGROUND OF THE INVENTION

1. Field of the Invention

The present invention relates to an apparatus and method for moving contents, particularly, to an apparatus and method for moving contents capable of moving contents having a restricted number of copies to another storage media.

2. Description of the Background Art

Recently, due to rapid growth of computer and communication technologies, information and communication have become more important in everyday life as well as science and business. Particularly, in the current information age, since every country in the world is constructing high speed communications nets competitively, various information will be provided, transmitted and consumed and a considerable part of such information will be secured by the copyright law.

Recorders, video recorders and copy machines using the analogue method make differences in quality between the original and the copy in costs, time and convenience and accordingly, those things can not actually significantly affect the copyright.

However, works on information and communication media such as the Internet significantly affect the copyright since the copy and the original are 100% identical and through the Internet images and voices as well as texts can be transmitted to the whole world.

Also, in the broadcasting field, the TV transmitting method is digitized by generalization of the digital compression technology and development of inexpensive receivers and accordingly, copy of contents through broadcasting affects the copyright significantly.

In the information age where all works such as images and records are digitized, infringement of the copyright has become easy and done in various forms and accordingly, exposing and getting rid of infringement of the copyright is difficult.

Therefore, since writing will be decreased and distribution of intellectual property rights is hindered unless the infringement of intellectual properties is prevented or the technologies for exposing the infringement is prevented, enterprises related to copyrights are making much effort to develop copy protecting technology as a technological means to secure works.

In the present, as a general technology for protecting copy, there is a method of restricting the number of copies to a certain number by inserting a copy control code in a header part of contents. The above technology will be applied to broadcasting contents as the digital broadcasting is popularized and the technology is partly now in use.

FIG. 1 is a schematic block diagram showing a copy apparatus of a conventional digital broadcast receiver.

As shown in FIG. 1, the conventional digital broadcast receiver includes a TV broadcast receiver 100 for receiving contents which a broadcasting station transmits and a recording apparatus 200 for storing the received contents.

The above TV broadcast receiver 100 includes a receiving unit 110 for receiving the contents and a first storage medium 120 for storing the contents supplied from the receiving unit 110 and the recording apparatus 200 includes a second storage medium 210 for storing the contents transmitted from the first storage medium 120.

The operation of a copying apparatus for the conventional digital broadcasting receiver will be described with reference to accompanied drawings as follows.

The receiving unit 110 of a TV broadcasting receiver receives contents transmitted through transmission media such as broadcast satellite or cable and stores the contents in the built-in first storage medium 120. At this time, the possible number of copies of the contents is decreased by one.

With the above storage method, the contents can be stored by the storage command of a user or new contents can be continuously stored automatically deleting old contents at a certain time interval according to the composition of the TV broadcast receiver 100.

Later, when the user demands to copy the contents to the second storage medium, the TV broadcast receiver 100 reads the contents from the first storage medium and judges the possible number of copy by analyzing the copy control code inserted in the header part of the contents.

FIG. 3 is a view showing a packet including a header in accordance with a conventional data packet. "DATA LENGTH" field specifies the length of the data field of data block payload packets and data block packets; "TAG" field provides a high-level label for the format of data carried by the packet; "CHANNEL" field specifies the channel number for the packet; "TCODE" field represents a transaction code, which specifies the packet format and the type of transaction to be performed; and "SY" field represents a synchronization code, and is an application-specific control field.

At this time, as shown in FIG. 3, the copy control code uses 2 bits among 4 bits of a synchronous bits in the header part of the data packet and is divided to unrestricted copy, restricted copy, a single copy and no copy according to the set value (00,01,10,11). Also, the other 1 bit is used in an encryption code of the data stream and the least significant bit of the synchronous bits is a reserved bit and not used.

After, TV broadcast receiver 100 reads the copy control code of the stored contents in the first storage medium, the TV broadcast receiver 100 copies the contents to the second storage medium according to the judged possible number of copy.

Namely, as shown in FIG. 2, if the copy control code is set as unrestricted copy (S201), the TV broadcast receiver 100 does not convert the copy control code and copies the contents to the second storage medium (S202 and S203), if the copy control code is set as restricted copy(S204), the receiver 100 stores the contents in the second storage medium 210 after decreasing by one from the possible number of copies by converting the copy control code(S205 and S206). On the contrary, if the copy control code is set as no copy, the TV broadcast receiver 100 can not copy the contents to the second storage medium regardless of demand of the user (S207).

By the way, the first storage medium 120 is restricted in capacity. Therefore, if the copy control code is set to no copy in case the user of the digital broadcast receiver is willing to store the contents for a long time or edit the contents, copying or editing of the contents from the first storage medium 120 to the second storage medium 210 is impossible.

SUMMARY OF THE INVENTION

Therefore, an object of the present invention is to provide an apparatus and method for moving contents capable of moving the position of stored contents under the condition that the number of contents is not increased.

Another object of the present invention is to provide an apparatus and method for moving contents capable of efficiently moving contents having a restricted number of copies to another storage media.

To achieve these and other advantages and in accordance with the purpose of the present invention, as embodied and broadly described herein, there is provided an apparatus for moving contents comprising a input unit for inputting contents and a control unit for controlling moving of the contents to other medium by analyzing a copy control code of the contents.

To achieve the above objects, there is provided a method for moving contents comprising the steps of analyzing a copy control code of the contents when a user selects moving of the contents from a first storage medium to a second storage medium and storing the contents the contents in the second storage medium by converting the copy control code of the contents according to the result of analysis.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
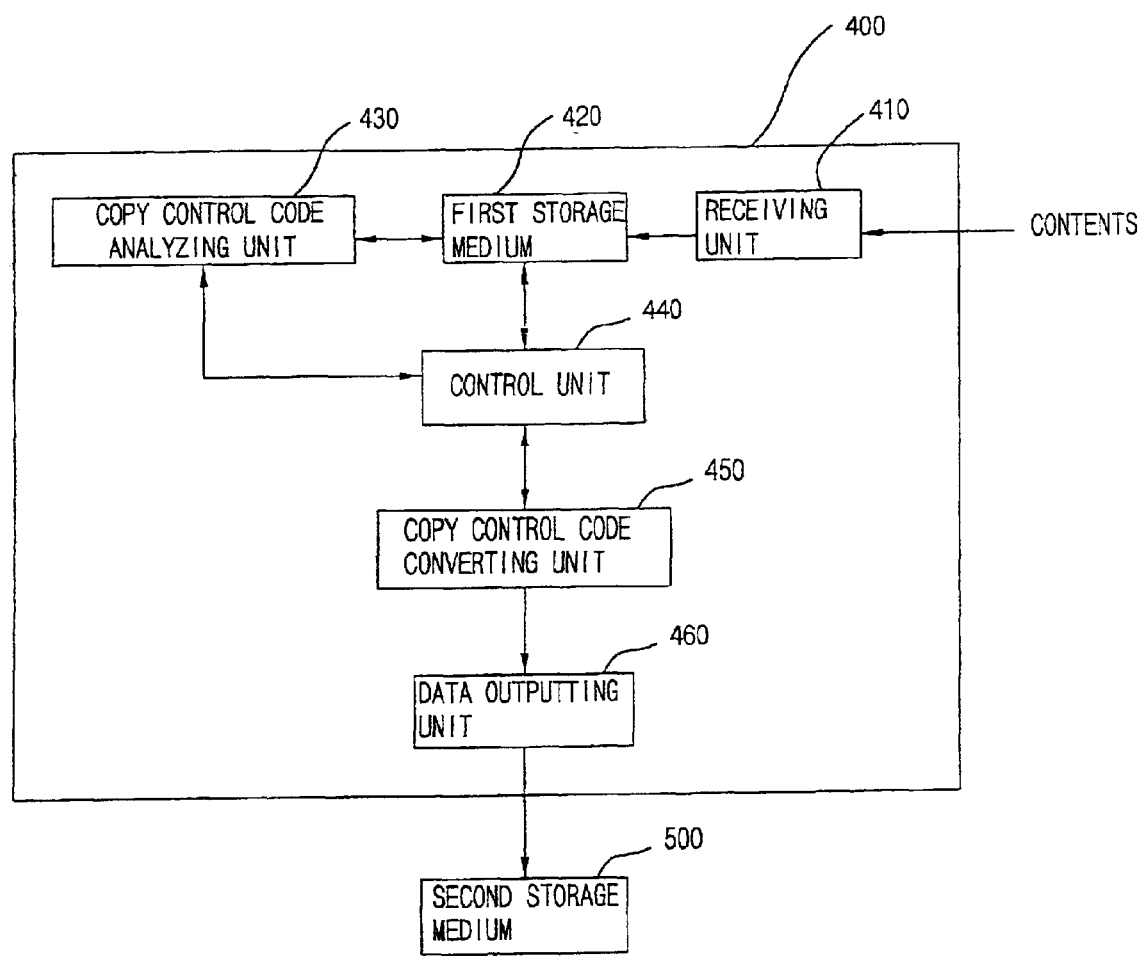
FIG. 4 is a block diagram showing an apparatus for moving contents in accordance with the present invention.

FIG. 4 is a block diagram showing an apparatus for moving contents in accordance with the present invention.

As shown in FIG. 4, an apparatus for moving contents in accordance with the present invention includes a TV broadcast receiver 400 for analyzing a copy control code of contents received from a broadcasting station, converting the copy control code according to the result of the analysis and outputting the converted code and a second storage medium 500 for storing the contents moved from the TV broadcast receiver 400 through an interface means.

The TV broadcast receiver 400 includes a receiving unit 410 for receiving the contents, a first storage medium 420 for temporarily storing the contents received from the receiving unit 410, a copy control code analyzing unit 430 for analyzing a copy control code of the contents stored in the first storage medium 320, a control unit 440 for controlling the operation of each unit needed to move the contents such as fetching, deleting and code converting from the first storage medium 420, a copy control code converting unit 450 for converting the copy control code of the contents according to the control of the control unit 440 and a data outputting unit 460 for transmitting contents fetched from the first storage medium having the converted copy control code to the second storage medium.

At this time, the second storage medium 500 can be included in the TV broadcast receiver 400, can be independent out of the receiver using a connection means such as a cable or can be included in another apparatuses (for example, a VCR for performing recording).

Figure 5:
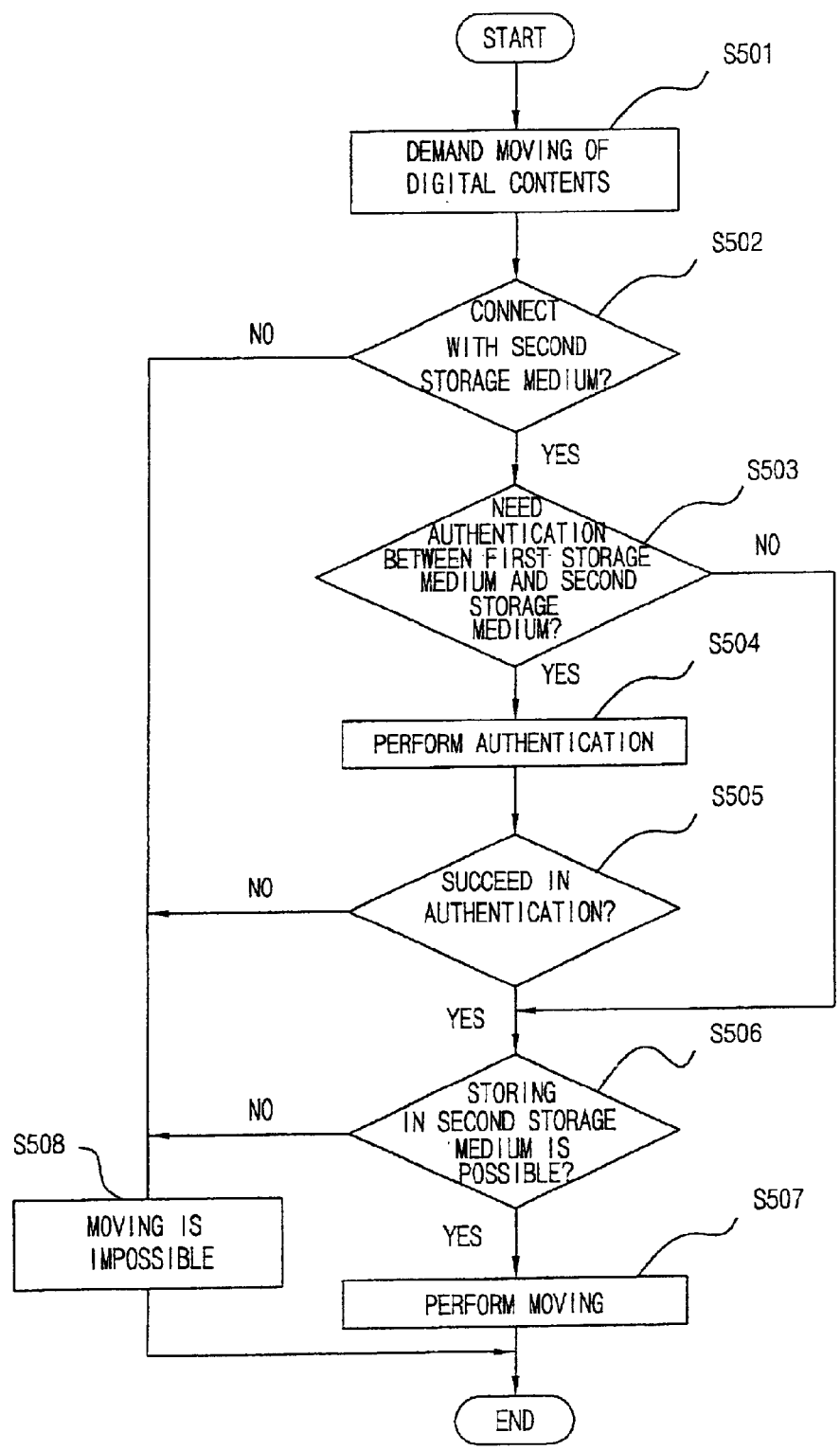
FIG. 5 is a flowing chart showing a method for moving contents in accordance with the present invention.

The operation of the apparatus for the moving the contents in accordance with the present invention will be described with reference to FIGS. 5 and 6.

The receiving unit 410 of the TV broadcast receiver receives the contents transmitted through the media such as a broadcasting satellite or a cable and stores the contents in the first storage medium 420 included in itself. At this time, the possible number of copies of the contents is decreased by one.

Later, when the user demands moving the contents, the control unit 440 checks whether the TV broadcast receiver and the second storage medium 500 are connected (S501 and S502). If they are connected, the control unit 440 judges whether an authentication is needed between the TV broadcast receiver 400 and the second storage unit 500 by analyzing the copy control code of the contents (S503).

Besides, if the copy control code of contents is set as unrestricted copy, the contents does not need any authentication. But if the copy control code of the contents is set as restricted copy or no copy, the contents are to be authenticated to maintain the restricted number of copies.

Therefore, the control unit 440 performs the step 506 in case the copy control code is set as unrestricted copy. But, in case the copy control code is set as restricted copy or no copy, mutual authentication is performed between the TV broadcast receiver 400 and the second storage medium 500 (S504 and S505). At this time, since the TV broadcast receiver 400 and the second storage medium 500 are authenticated by each peculiar key values, in case a medium rejects the authentication demand or the authentication is not succeeded, moving the contents is not possible (S508).

When the authentication between the TV broadcast receiver 400 and the second storage medium 500 is performed successfully (S505), the control unit controls of moving the contents stored in the first storage medium 420 to the second storage medium 500 only in status which the second storage medium 500 can be written (S506 and S507).

Figure 6:
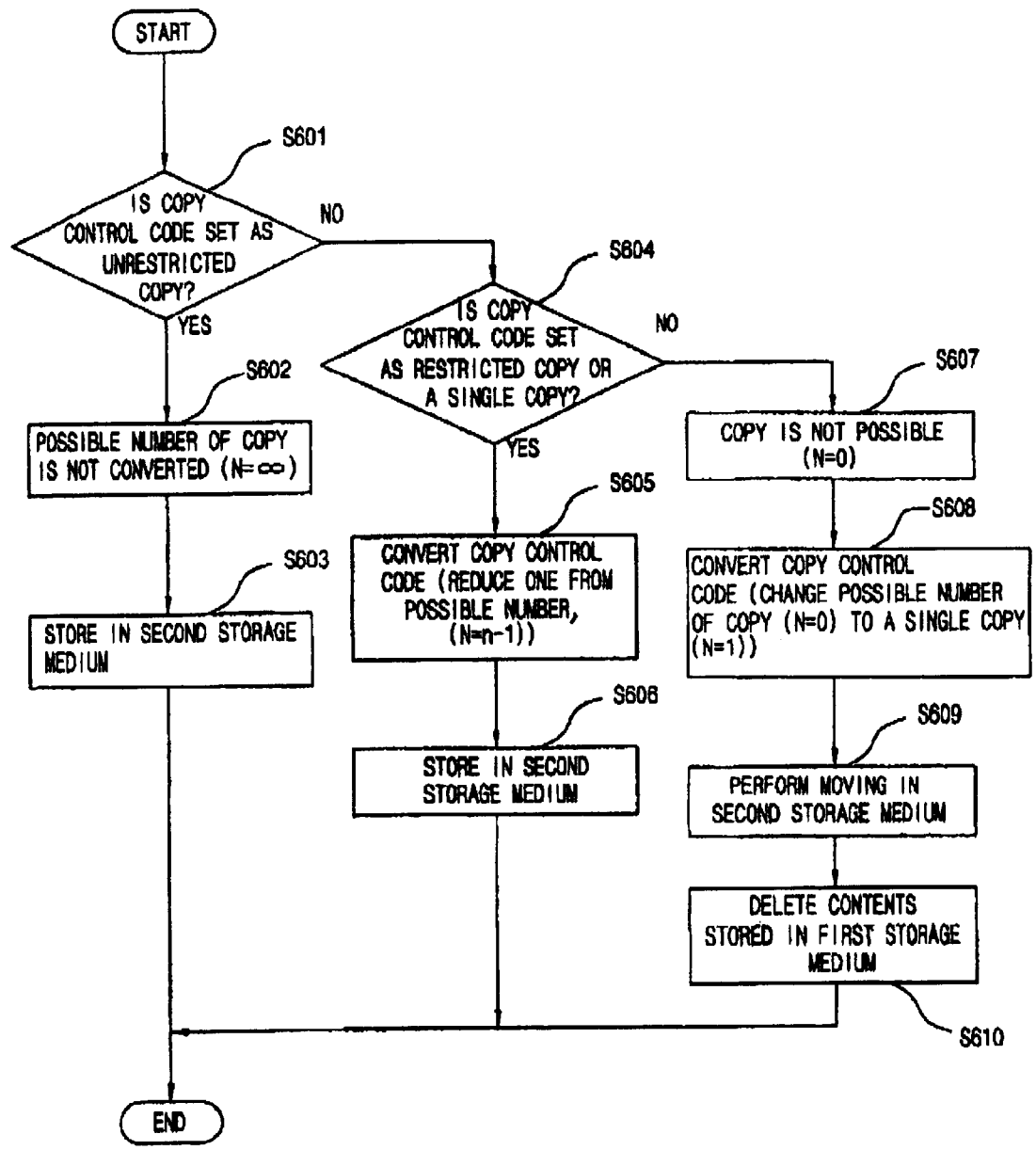
FIG. 6 is a detailed flowing chart showing the step for moving contents of FIG. 5.

FIG. 6 is a detailed flowing chart showing the step of moving the contents (S507).

As shown in FIG. 6, in the step of moving (S507), the moving operation is performed according to the possible number of copy determined by analyzing the copy control code inserted in the header part of the contents.

Namely, if the copy control code is set as unrestricted copy (possible number of copy is N, N=∞), the copy control code is not converted by the copy control code converting unit 450 (S601 and S602). Later, the control unit 440 stores the above contents to the second storage medium 500 through the data outputting unit 460 (S603).

Also, if the copy control code is set as restricted copy (N=n), the copy control code of the contents stored in the first storage medium 420 decreased by one time by the copy control code converting unit 450 (S604 and S605). The control unit 440 stores the contents in the second storage medium 500 through the data outputting unit 450 (S606).

Also, if the copy control code is set as no copy (N=0), the copy control code of the contents stored in the first storage medium 420 is changed to a single copy by the copy control code converting unit 450 (S607 and S608) in order to move the contents from the first storage medium to the second storage medium. Here, in case the copy control code is set as no copy, the above contents are divided to copy control code is set as a single copy or no copy before the contents are stored in the first storage medium 420. At this time, in case the copy control code of the contents is set as no copy, this case is not included in the present invention, because the contents cannot be stored in the first storage medium 420. However, in case the copy control code is set as no copy by being stored in the first storage medium 420, the present invention is applied to the case. Later, the control unit 440 stores the contents to the second storage medium 500 through the data outputting unit 460 and then moving the contents is completed by deleting the original written in the first storage medium 420 (S609 and S610).

Since the contents are moved as above, the number of the contents is same as that of before the movement.

As another embodiment from the above moving method, the present invention sets a moving determination bit in the contents in advance and accordingly, moving of the contents can be performed according to the moving determination bit.

Figure 7:
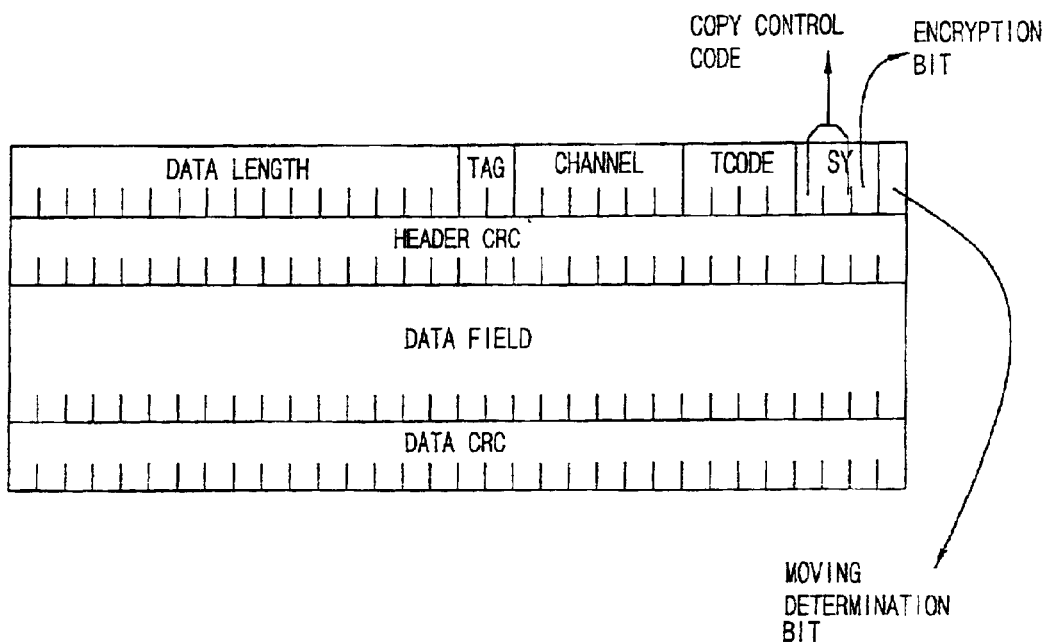
FIG. 7 is a view showing a header of the packet in accordance with the present invention.

Namely, as shown in FIG. 7, the present invention sets the least significant bit as a moving determination bit in the synchronous bits and if the contents can be moved, the moving determination bit is set as '1' and if the contents can not be moved, the moving determination bit is set as '0'.

Therefore, if the user demands moving the contents to the second storage medium 500 after the contents are temporarily stored in the first storage medium 420 by being received in the receiving unit 410 of the TV broadcast receiver 400, the control unit 440 can judge whether the contents can be copied or not in advance according to the moving determination bit after reading the moving determination bit of the contents.

Figure 1:
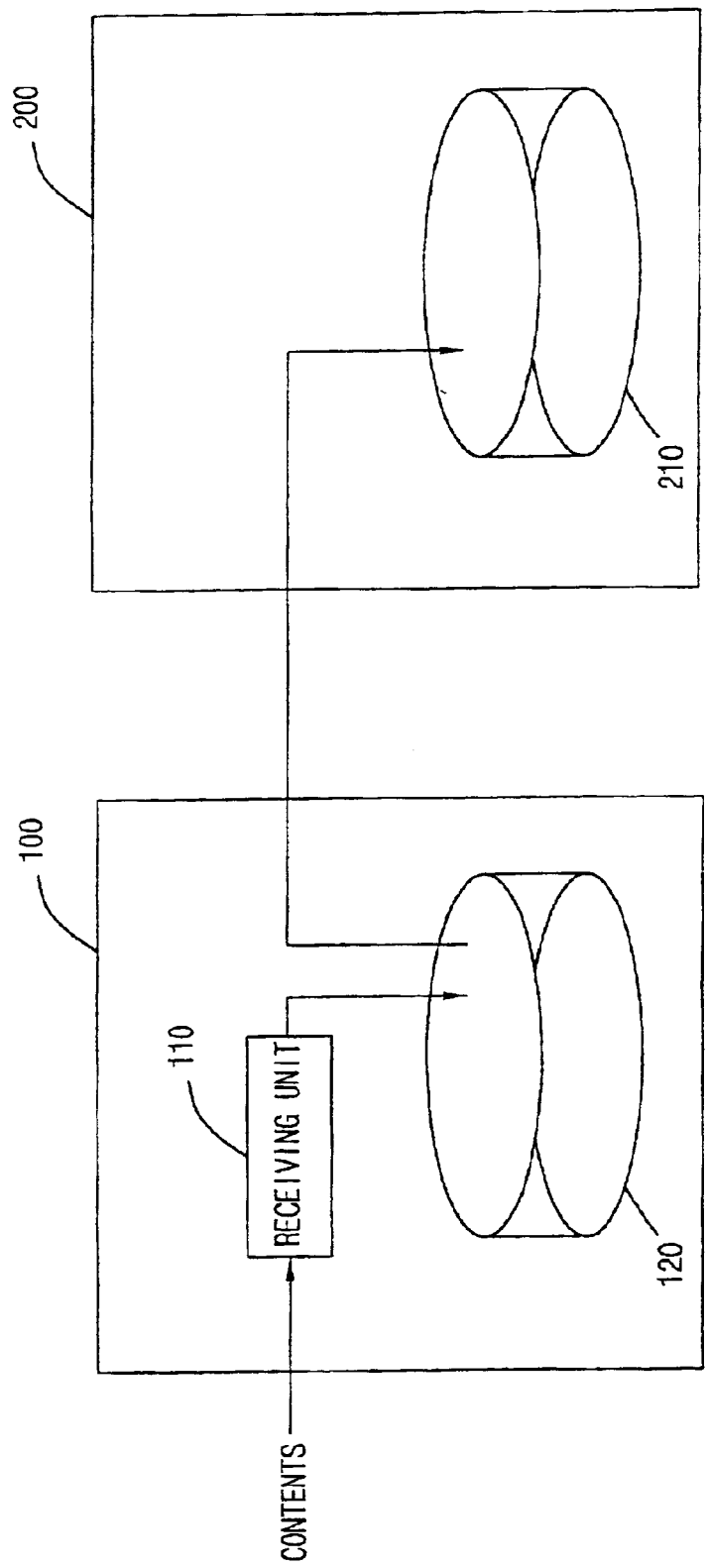
FIG. 1 is a schematic block diagram showing a conventional copy apparatus.
Figure 2:
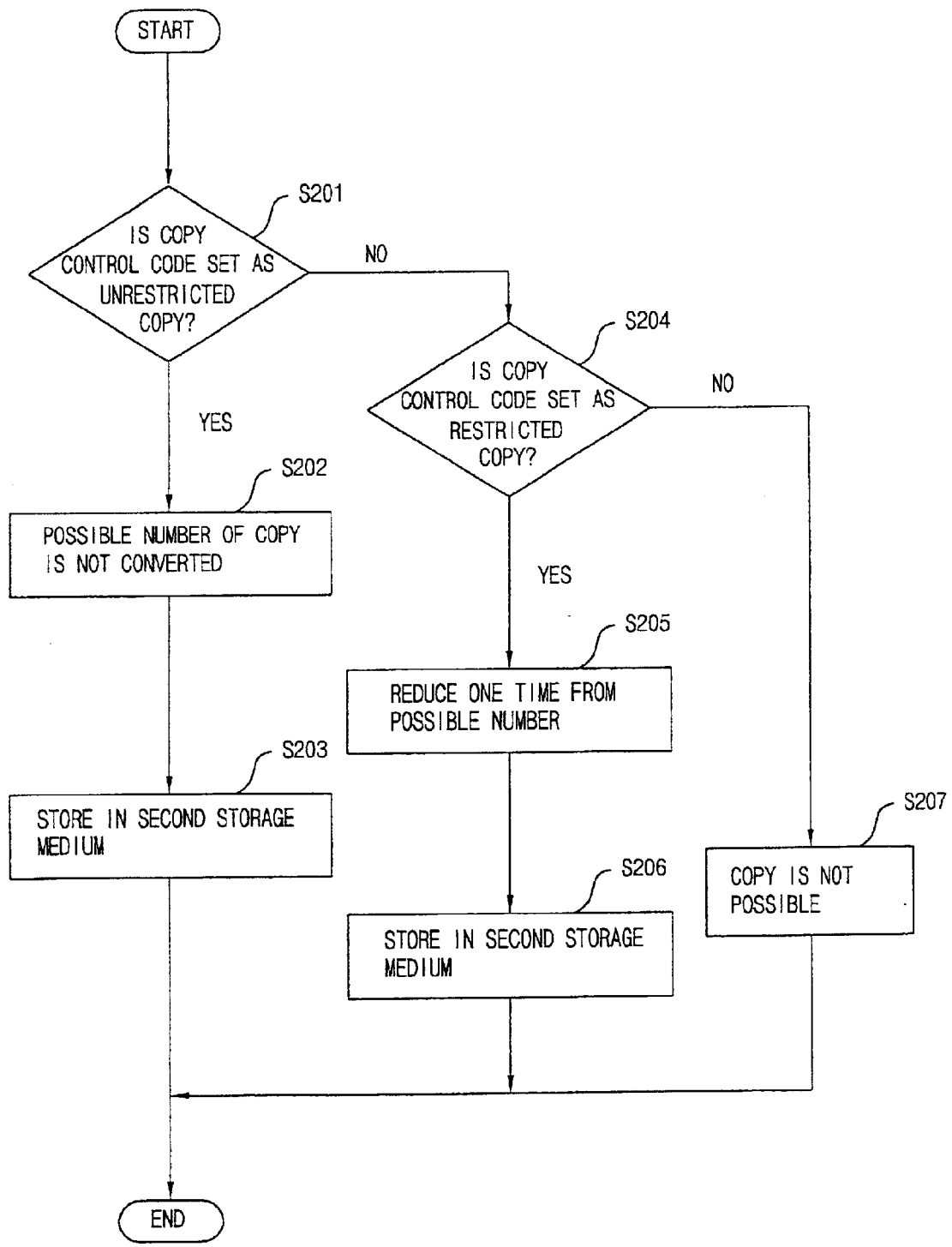
FIG. 2 is a flowing chart showing a method for copying contents of FIG. 1.
Figure 3:
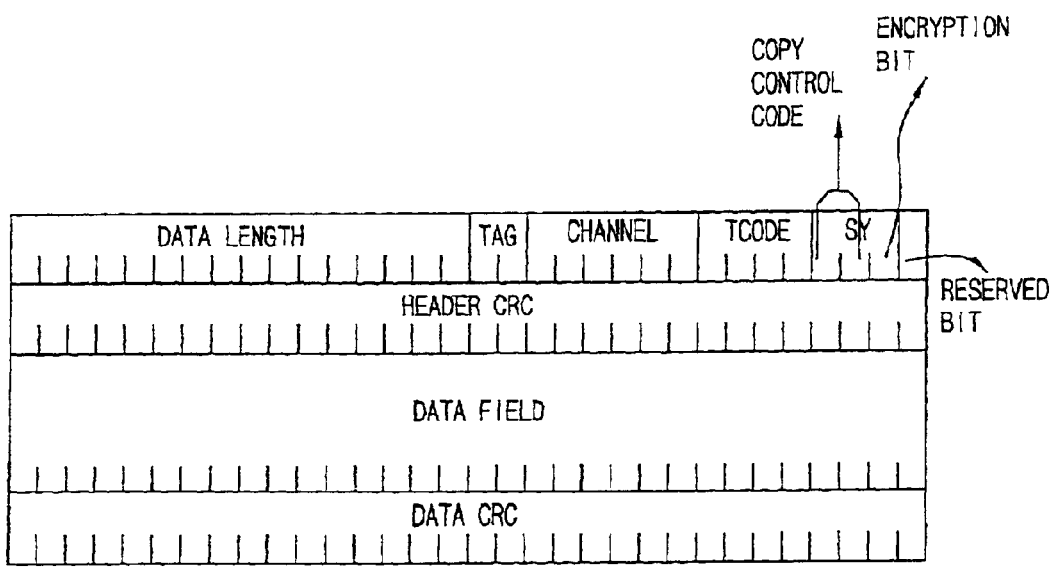
FIG. 3 is a view showing a header of a conventional data packet.

Namely, unless the moving determination bit is set as capable of moving, the contents can not move to the second storage medium 500 and accordingly, the contents can be stored with the copy method as in FIG. 2 of the conventional art. However, if the moving determination bit is set as capable of moving, the contents can be moved in the second storage medium 500 as in the process shown in FIGS. 5 and 6.

As another embodiment from the above TV broadcasting receiver 400, the present invention can be embodied as a processor(not shown) which includes units of TV broadcasting receiver 400, or as a processor(not shown) which is programmed with the above method of moving contents.

The method of moving the contents is that the user moves the contents to the second storage medium 500 by analyzing and converting the copy control code of the contents after the contents are stored the first storage medium 420, as described above. However, the first storage medium 420 can be included in the Personal Video Recorder, and can be included in another apparatuses (for example, Personal Computer, Digital Video Disc, Digital Video Home System) using a connection means (for example, IEEE1394, Universal Serial Bus).

As described above, the apparatus and method for moving the contents can move the storing position of the contents not increasing the number of the contents.

As the present invention may be embodied in several forms without departing from the spirit or essential characteristics thereof, it should also be understood that the above-described embodiments are not restricted by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus for moving contents, comprising:
   a receiver for receiving contents;
   a storage medium for storing the received contents; and
   a processor for processing a program which controls the movement the contents to a second other storage medium by analyzing a copy control code of the contents, and storing the contents in the second storage medium according to the result of the analysis, wherein the copy control code of the contents is converted to one the possible number of copies of the contents if the copy control code is determined to indicate no copies as a result of the above analysis and if a command for the moving is generated, wherein the moving of the contents is only possible when mutual authentication is performed between the first storage medium and the second storage medium.

2. The apparatus of claim 1, wherein the processor deletes the original contents of the storage medium after the contents move to the second storage medium.

3. The apparatus of claim 1, further comprising an interface for interfacing between the first storage medium and the second storage medium.

4. A method for moving contents, comprising the steps of:
   analyzing a copy control code of the contents when a user demands moving the contents from a first storage medium to a second storage medium; and
   storing the contents in the second storage medium according to the result of analysis, wherein the copy control code of the contents is converted to one the possible number of copies of the contents if the copy control code is determined to indicate no copies as a result of the above analysis, wherein the moving of the contents is only possible when mutual authentication is performed between the first storage medium and the second storage medium.

5. The method of claim 4, wherein the copy control code of contents is not converted if the copy control code is determined to indicate an unrestricted number of copies.

6. The method of claim 4, further comprising a step of:
   deleting original contents stored in the first storage medium.

* * * * *